UNITED STATES PATENT OFFICE.

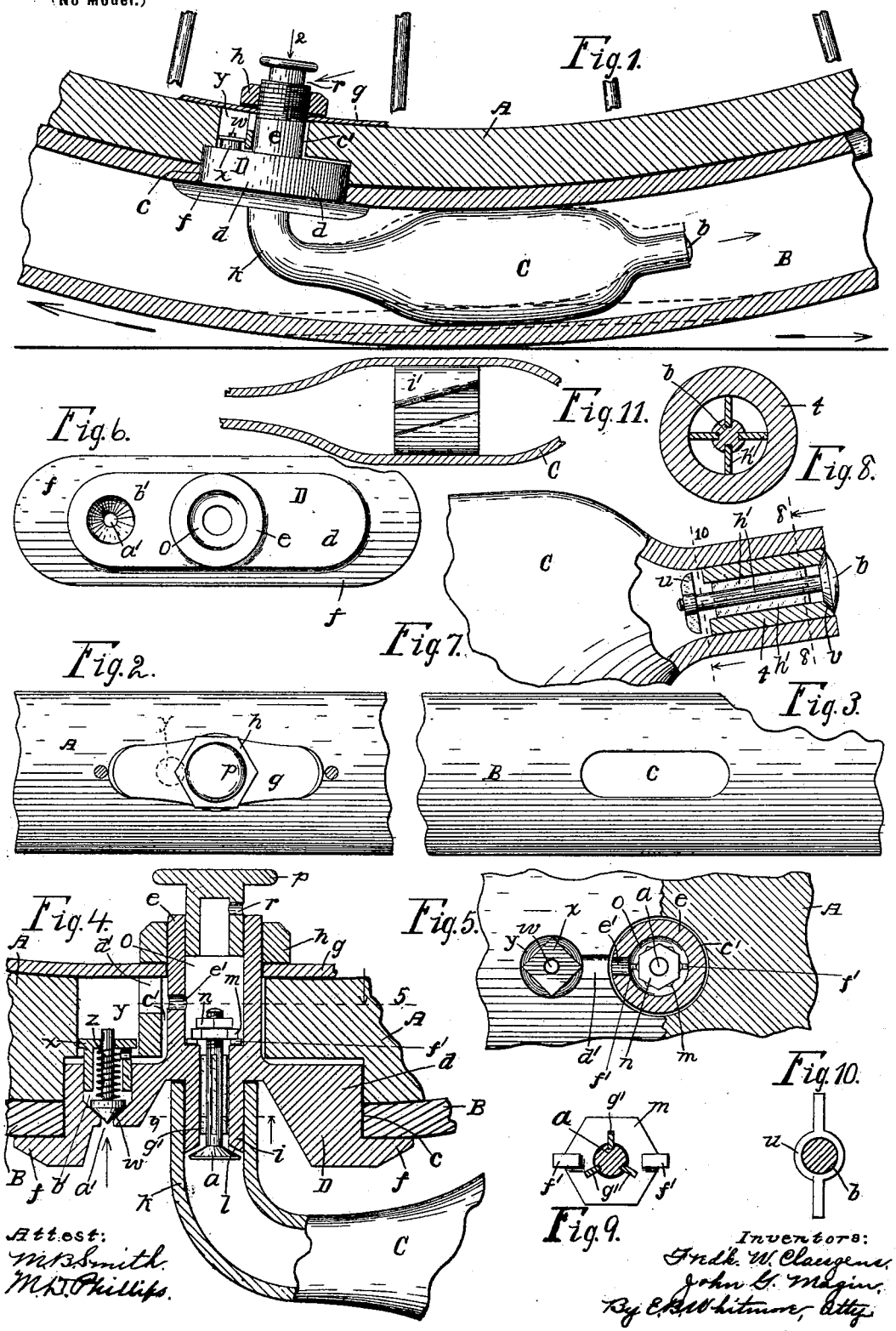

FREDERICK W. CLAESGENS AND JOHN G. MAGIN, OF ROCHESTER, NEW YORK, ASSIGNORS OF ONE-THIRD TO GEORGE A. CLAESGENS, OF ROCHESTER, NEW YORK.

DEVICE FOR INFLATING PNEUMATIC TIRES.

SPECIFICATION forming part of Letters Patent No. 706,021, dated August 5, 1902.

Application filed February 15, 1902. Serial No. 94,280. (No model.)

*To all whom it may concern:*

Be it known that we, FREDERICK W. CLAESGENS and JOHN G. MAGIN, of Rochester, in the county of Monroe and State of New York, have invented a new and useful Improvement in Devices for Inflating Pneumatic Tires, which improvement is fully set forth in the following specification and shown in the accompanying drawings.

Our invention is a device for automatically filling or inflating the pneumatic or india-rubber tires of bicycles or other vehicles, the same being hereinafter fully described, and more particularly pointed out in the claims, reference being had to the accompanying drawings, forming a part of this specification.

Figure 1 is a central longitudinal section of parts of the felly and the pneumatic tire of a wheel, showing our invention in place therein, parts being shown in two positions by full and dotted lines. Fig. 2 is a view of the parts seen as indicated by arrow 2 in Fig. 1. Fig. 3 is a view of a part of the rubber tire seen as indicated by arrow 2 in Fig. 1, showing the opening therein. Fig. 4 is a central longitudinal section of the device and some associated parts sectioned as in Fig. 1. Fig. 5 is a horizontal section of parts on the dotted line 5 in Fig. 4. Fig. 6 is a plan of the air-bulb head detached seen as indicated by arrow 2 in Fig. 1. Fig. 7 is a side elevation of a part of the delivery end of the air-bulb, partly in central longitudinal section, showing the discharge-valve. Fig. 8 is a transverse section of parts on the dotted line 8 8 in Fig. 7. Fig. 9 is a transverse section of the inlet-valve on the dotted line 9 in Fig. 4, showing the form of the under face of the space-disk. Fig. 10 is a cross-section of the discharge-valve on the dotted line 10 in Fig. 7. Fig. 11 is a central longitudinal section of a part of the air-bulb, showing the contained spring. Figs. 1, 2, 3, and 11 are drawn to a scale smaller than the scales of the remaining figures.

Referring to the parts shown, A is the felly of a vehicle-wheel of ordinary construction, B being the pneumatic tire on the felly.

C is an india-rubber air-bulb within the tire, having a normal external diameter such as to cause it to press outward all around against the inner surface of the tire.

D, Figs. 1, 4, and 6, is a body, as of metal, constituting a head for the air-bulb, the neck $k$ of which passes tightly over a hollow part or thimble $i$ of the head D, as shown. The oblong part $d$ of the head, having rounded ends, occupies a longitudinal opening $c$, Figs. 3 and 4, in the side of the tire next the felly, the flange $f$, Figs. 1, 4, and 6, of the head having been first passed through the opening into the interior of the tire to bear all around against the inner surface of the tire, as shown. The head D is further formed with a threaded stem $e$, Figs. 1, 4, 5, and 6, having a central chamber $o$ extending centrally from and at right angles with the part $d$ through the felly A, this stem being coaxial with the thimble $i$, holding the air-bulb. The stem is provided on the inner face of the felly with a metal bearing-plate $g$ and screw-nut $h$, by means of which to hold the parts together and draw the flange $f$ firmly against the adjacent part of the tire to prevent leaking of air therefrom, the part of the tire around the opening $c$ being by this means pressed firmly between the flange and the opposing face of the felly. An inlet-valve $a$, Figs. 4 and 5, is provided for the air-bulb in the thimble $i$, the valve-seat being at $l$ against the inner end of the thimble. The opposite end of the valve is threaded and provided with an adjustable threaded disk or part $m$ in the chamber $o$ of the stem $e$ to control the endwise motions or play of the valve. A set-nut $n$ is employed, turned firmly against the disk $m$ to hold the latter from turning on the valve, said disk being primarily adjusted on the valve to allow of a proper extent of motion for the valve. The disk is provided with downward extensions or feet $f'$, Fig. 9, for holding it up off of the bottom or inner end of the chamber $o$ to the end that there shall always be space beneath the disk for an inflow of air to the bulb C. The valve is provided with radial wings $g'$, touching the inner surface of the thimble $i$ to cause the motions of the valve to be truly endwise.

The outer end of the stem $e$ is internally threaded to receive a threaded closing part or stopper $p$, this stopper being formed with a small opening $r$, Fig. 4, at the end of the stem to complete and make continuous an air-passage from without to the interior of the bulb C. At its opposite end the air-bulb C is formed with an outlet-opening for the air and provided with an outlet-valve $b$, Fig. 7, to control the opening, the valve being held within a thimble $t$, inserted in the reduced end of the bulb. This valve is formed with radial controlling-wings $h'$, Figs. 7 and 8, and provided at its inner end with a stop piece or head $u$, Fig. 10, to control its endwise motions, the valve-seat being at $v$ against the outer end of the thimble $t$.

As the wheel is propelled the air-bulb will be compressed by the weight of the vehicle and the rider, as appears by dotted lines in Fig. 1, each time it is brought to the bottom of the wheel or near the ground, and as the wheel rolls onward carrying the air-bulb upward and out from under the pressure due to the weight above mentioned the air-bulb will again expand to its normal form and size, drawing in a new supply of air from without through the passages in the head D, as above described. These successive alternate compressions and expansions of the air-bulb will cause jets of air to be intermittently drawn into the air-bulb and discharged into the tire through the outlet-valve $b$. In these repeated actions of the air-bulb the inlet-valve $a$ and the outlet-valve $b$ act in the usual manner of such valves, each in its turn constituting a stop to prevent a flow of air from within the tire outward, the actions of the parts serving to cause air to move into the tire.

In case of wheels of small diameter, in which the compressing of the air-bulb occurs in quick succession, we sometimes form the bulb with an internal coiled spring $i'$, Fig. 11, to cause it to expand more quickly to draw in air ready for another compression when the wheel brings it down.

To guard against an undue pressure of air being brought within the tire by the actions of the bulb, an outlet or escape valve $w$, Figs. 4 and 5, is provided in the head D. This valve is held in a cage $x$, threaded in a cavity $b'$ in the head, a spring $z$ on the valve serving to hold it normally down against its seat to close the vent-opening $a'$. The felly A is formed with a chamber $y$ over the cage $x$, through which to place the latter in the head D, the chamber being connected with the opening $c'$ in the felly by a passage $d'$, Figs. 4 and 5. There is an opening $o'$ through the cage for the air into the chamber $y$ and a similar opening $e'$ through the side of the stem $e$ in line with the passage $d'$, which with the opening $r$ in the stopper $p$ completes a continuous passage for air escaping from the interior of the tire to the space without. By turning the cage $x$ farther into or out of the cavity $b'$, thus bringing a greater or a less pressure upon the spring $z$, the pressure of the air within the tire may be regulated.

It is clear that more than one air-bulb may be employed in the tire B should it be found desirable to use more, all working as the one shown and described.

What we claim as our invention, and desire to secure by Letters Patent, is—

1. In a device for inflating pneumatic tires, an air-bulb having discharge-valve at one end, a head holding the other end and having a chamber with side opening, a stopper having an opening, a cage adjustable in a cavity in said head and having an opening in communication with the side opening of the chamber in the head, and a valve mounted in said cage and fitted to a seat in the bottom of said cavity, all substantially as shown and described.

2. A device for automatically inflating pneumatic tires comprising an air-tube with outlet-valve at one end, a neck at the other end extending substantially at right angles thereto, a stem passed through the rim and engaging the inner wall of the tire and having a thimble for engagement with said neck, a valve in the neck guided in the thimble and fitted to a seat upon its inner end, means on the outer end of the stem for holding the parts together, and a stopper to said stem having an opening, a flange on the inner end of said stem having a vent-opening and valve-seat, a cage in said flange having an opening, and a spring-actuated valve in said cage and fitted to said seat.

In witness whereof we have hereunto set our hands, this 10th day of February, 1902, in the presence of two subscribing witnesses.

FREDERICK W. CLAESGENS.
JOHN G. MAGIN.

Witnesses:
PATRICK CAULEY,
JAMES E. MALLEY.